United States Patent [19]

Efimov et al.

[11] 4,250,322

[45] Feb. 10, 1981

[54] OLIGOURETHANACRYLATES AND METHODS FOR THEIR MANUFACTURE

[76] Inventors: Alexei V. Efimov, prospekt Lenina 85, kv. 43, Dzerzhinsk, Gorkovskoi oblasti; Alfred A. Berlin, Leninsky prospekt 57, kv. 9, Moscow; Tamara Y. Kefeli, Krasnoprudnaya ulitsa, 22/24, kv. 103, Moscow; Nina V. Varlamova, Dmitrovskoe shosse 40/7, kv. 20, Moscow; Grigory M. Strongin, prospekt Lenina 83, kv. 2a, Dzerzhinsk, Gorkovskoi oblasti; Judif M. Altshuler, Uchebny pereulok, 8, kv. 67, Dzerzhinsk, Gorkovskoi oblasti; Boris I. Kolomazov, prospekt Pobedy 1/2, kv. 8, Dzerzhinsk, Gorkovskoi oblasti, all of U.S.S.R.

[21] Appl. No.: 65,633

[22] Filed: Aug. 10, 1979

Related U.S. Application Data

[63] Continuation of Ser. No. 467,516, May 6, 1974, abandoned, which is a continuation of Ser. No. 334,483, Feb. 2, 1973, abandoned.

[51] Int. Cl.$^3$ .............. C07C 125/073; C07C 125/075
[52] U.S. Cl. ........................................ 560/26; 560/9; 560/13; 560/29; 560/115; 560/133; 560/137; 560/158; 560/160
[58] Field of Search ................ 560/9, 13, 26, 29, 115, 560/137, 158, 160, 133

[56] References Cited

U.S. PATENT DOCUMENTS

| | | | |
|---|---|---|---|
| 2,683,735 | 7/1954 | Cusic | 560/32 |
| 2,888,440 | 5/1959 | Frazer et al. | 560/26 X |
| 3,022,334 | 2/1962 | Frazer | 560/158 |
| 3,297,745 | 1/1967 | Fekete et al. | 560/26 |
| 3,357,932 | 12/1967 | Heydkamp et al. | 560/115 X |
| 3,397,184 | 8/1968 | Heydkamp et al. | 560/160 X |
| 3,428,614 | 2/1969 | Brownstein | 560/115 X |
| 3,856,830 | 12/1974 | Kuehn | 560/26 X |
| 3,907,751 | 9/1975 | Knight et al. | 260/47 UA |

*Primary Examiner*—Richard Raymond
*Attorney, Agent, or Firm*—Holman & Stern

[57] ABSTRACT

A method for preparing oligourethanacrylates having the general formula

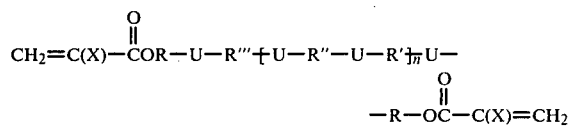

where

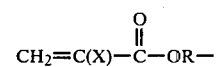

is a radical of a telogen;
X is H, CH$_3$ or a halide;
R is a radical of glycol, bis-phenol, amino alcohol;
R' is a radical of polyamine:
R'' is a radical of polyol;
R'' is R' if the telogen contains

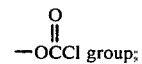

—OCCl group;

R''' is R'' if telogen contains-N(Y)H group;
Y is a substitute at the nitrogen atom in the telogen selected from the group consisting of a hydrogen atom and an aryl radical;
n is the number characterizing the degree of polycondensation of the oligourethanacrylate equal to zero, unity, or a whole number greater than unity, consisting in carrying out a reaction of an non equilibrium polycondensation of chloroformiates of polyols with polyamines and telogens, which are chloroformates of monoesters of alkyleneglycols and acids of the acrylic series, chloroformates of monoesters of bis-phenols and acids of the acrylic series, monoaminoalkyl esters of acids of the series, N-substituted monoaminoalkyl esters of acids of acrylic series, in a medium of organic solvents or in a system water-organic solvent, in the presence of acceptors of hydrogen chloride which is liberated in the reaction.

20 Claims, No Drawings

OLIGOURETHANACRYLATES AND METHODS FOR THEIR MANUFACTURE

This is a continuation of application Ser. No. 467,516, filed May 6, 1974, now abandoned, which in turn is a continuation of Application Ser. No. 334,483, filed Feb. 2, 1973, now abandoned.

This invention relates to a new group of polymerizable oligomers, and more particularly, to oligourethanacrylates, to the methods for preparing them and to polymers on the basis thereof.

It is commonly known that polyurethanes are very important materials in the manufacture of various polymers and articles.

Owing to a unique combination of high physico-chemical properties, good resistance to attrition, stability against the action of many solvents, oxidants, water, oils and fuels, exhibiting high adhesion strength with respect to various materials, and many other valuable properties, polyurethanes are used on an ever increasing scale in the manufacture of elastomers, foams, protective coatings, glues, sealing compounds and other polymeric materials.

The range of starting materials that can be used in the manufacture of polyurethanes is quite numerous, and this makes it possible to prepare polyurethanes having varied structures and different number of cross links, varying flexibility of its macromolecules and high character of the intermolecular interaction, and to prepare materials possessing wanted properties.

The method most widely used in the manufacture of polyurethanes is based on the polycondensation reaction between low-molecular or oligomeric di- or polyisocyanates and alkyleneglycols of carbon- or heterochain diols or polyols of various structures.

If bifunctional components are used, polyurethanes of linear structure are formed. The increasing number of functional groups to three or more results in branched or reticulate polyurethanes.

The formation of polyurethanes by the above method proceeds according to the mechanism of migration polymerization.

Known in the prior art are methods for preparing reticulate polyurethanes, consisting of joining the reaction of interaction between isocyanates and glycols or their monosubstituted derivatives with the reaction of radical polymerization of vinyl compounds, which ensure increased thermal stability and improve some mechanical properties of the polymers.

According to the above-mentioned methods for preparing reticulate polyurethanes, first oligomeric compounds containing urethane groups and unsaturated polymerizable groups are synthesized, for example, by the interaction between oligoetherglycols and oligoesterglycols or oligodienediols with diisocyanates and monometacrylic ether of ethyleneglycol, or by the interaction between oligoglycols with vinyl monomers containing isocyanate group. The thus prepared oligomeric compounds are then polymerized according to the radical mechanism with the formation of polyurethanes having reticulate structure.

The main disadvantage of the above-mentioned methods for preparing polyurethanes is the use of isocyanates which are necessary to form urethane bonds.

The formation of urethane with the use of isocyanates is usually accompanied by side reactions which produce allophanic and biuret groups possessing low stability with respect to temperature and oxidation, and incapable of bearing stress, and hence impairing properties of polyurethanes.

Most aliphatic and aromatic isocyanates are toxic compounds and therefore special precautions should be taken because of their high volatility.

A restricted number of representatives of the aliphatic and aromatic isocyanates produced on an industrial scale makes it impossible to vary widely the structure, and hence, the properties of polyurethanes produced on their basis.

Moreover, the methods for preparing isocyanates having practical importance, are labour-consuming and consist of several steps (for example, separation and purification of isomers in the synthesis of toluylenediisocyanates) which raises the cost of these products.

The object of this invention is to work out new polymerizable oligomeric compounds containing in their molecules urethane groups without using isocyanates.

Another object of this invention is to rule out the formation of undesirable unstable allophanic and biuret bonds in the synthesized oligourethanacrylates, which improves significantly the service characteristics of polyurethanes on their basis.

Another object of this invention is also the preparation of oligourethanes on the basis of less toxic, cheaper and more readily available starting products.

Still another object of the invention is to prepare polymers with three-dimensional reticulate structure having valuable physico-mechanical properties on the basis of synthesized liquid and crystalline oligourethanacrylates of various structure.

These and other objects and advantages of this invention will become clear from the description which follows hereinafter.

The said objects have been attained in polymerizable oligourethanacrylates characterized according to the invention by the following general formula:

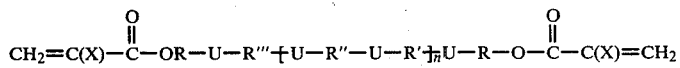

where

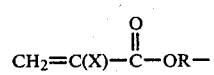

is a radical of a telogen which is:
(a) a chloroformates of monoesters of alkyleneglycols and acids of the acrylic series, chloroformates of monoesters of bis-phenols and acids of the acrylic series;
(b) monoaminoalkyl ester of acrylic acid, N-substituted monoaminoalkyl ester of acids of the acrylic series;

X is H, CH$_3$ or a halide;

R is a radical of glycol, bis-phenol or amino alcohol;

U is an urethane group having the structure (a)

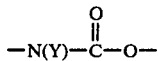

if the telogen contains the —N(Y)—H functional group; or (b)

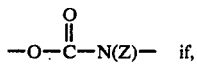

the telogen contains the

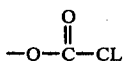

functional group;

Y is a substitute at the nitrogen atom of the telogen, which is a hydrogen atom, or an aryl radical;

Z is a substitute at the nitrogen atom of the aliphatic polyamine, a hydrogen atom, alkyl radical or aryl radical;

R' is a radical of aliphatic polyamine, N-substituted radical of the aliphatic polyamine containing from 2 to 10 carbon atoms, a radical of polyamine having the formula:

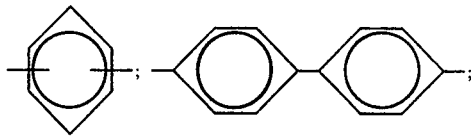

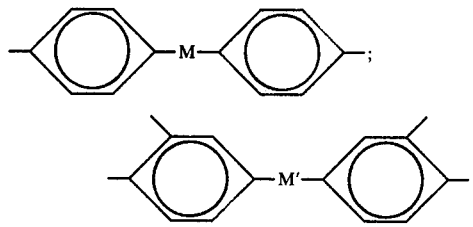

where:

M is $CH_2$; O; S; $SO_2$; NH;

M' is $CH_2$ or O;

R" is a radical of a polyol containing an aliphatic hydrocarbon radical containing from 2 to 10 atoms of carbon, a radical of bis-phenol, a radical of polyalkyl oligoester;

R'" is R', if the telogen contains the

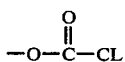

functional group;

R'" is R", if the telogen contains the —N(Y)H functional group;

M is a number characterizing the degree of polycondensation of oligourethanacrylate equal to zero, unity or a whole number greater than unity. The said polymerizable oligourethanacrylates have been prepared by the method according to the invention consisting in carrying out the reaction of non-equilibrium polycondensation of polyol chloroformates with polyamines and telogens selected from the group consisting of chloroformates of monoesters of alkylglycols and acids of the acrylic series, chloroformates of monoesters of bisphenols and acids of the acrylic series, monoaminoalkyl esters of the acids of the acrylic series, with simultaneous or step-wide introduction of the reactants into the reaction mixture in the presence of acceptors of hydrogen chloride which is evolved in the reaction.

The method according to the invention can be relized in two versions.

In the first version, the non-equilibrium polycondensation of the said components is carried out according to the invention in a medium of an organic solvent at temperatures within the range from minus 10° C. to the boiling point of the particular solvent used.

In the second version, the method is realized, according to the invention, in a water-organic solvent system at room temperature.

The prepared new polymerizable oligourethanacrylates characterized by the above general formula contain in their molecules urethane groups and polymerizable terminal or regularly arranged groups of the acryl type. The acryl type groups are introduced into the oligourethanacrylates together with the telogens.

The telogens are compounds containing in their molecules a terminal unsaturated group of the acryl type capable of polymerization and the functional amine group or chloroformates group participating in the process of condensation. The telogens are compounds having the following structure;

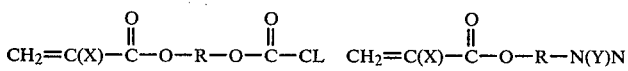

where R, X and Y correspond to those in the general formula of oligourethanacrylates.

Chloroformates of monoesters of alkylene glycols or bis-phenols, and acids of the acrylic series, for example, chloroformates of monoacrylic, monoethacrylic, monohalide acrylic esters of ethyleneglycol, diethylene glycol, triethyleneglycol, propyleneglycol-1,3; butyleneglycol-1,4; pentamethyleneglycol-1,5; diphenylolpropane, resorcinol, hydroquinone, etc., are used as the telogens.

The telogens containing the functional amino group can also be monoaminoalkyl ester of the acids of the acrylic series and N-substituted esters of the acids of the acrylic series containing not less than one hydrogen atom at the nitrogen atom, for example, 2-aminoethylacrylate, 2-aminoethylmethacrylate, 2-phenylaminoethylmethacrylate, etc.

The urethane groups of oligourethanacrylates are formed as a result of the reaction of condensation of the functional chloroformates groups of chloroformates of polyols or telogens with amino groups of polyamines or telogens.

If the telogen contains the functional —N(Y)H group and reacts with the chloroformate group of the polyol chloroformate, urethane group having the following structure is formed

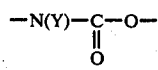

If the telogen contains the functional chloroformate group —O—CO—CL and reacts with the amino group of the polyol, the urethane group is formed having structure

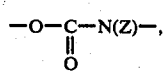

where Y and Z are the same as in the general formula for oligourethanacrylates.

The required chloroformates of polyols are bis-chloroformates of ethyleneglycol, diethyleneglycol, triethyleneglycol, propyleneglycol, butyleneglycol, pentamethyleneglycol, hexamethyleneglycol, octamethyleneglycol, decamethyleneglycol, bis-chloroformates of polyoxyethyleneglycols and polyoxypropyleneglycols, bis-chloroformates of diphenylolpropane, resorcinol, hydroquinone, chloroformates of etriol, glycerol, pentaerythritol, etc. Polyamines used in the proposed method are ethylenediamine, tetramethylenediamine, pentamethylonediamine, hexamethylenediamine, octamethylenediamine, decamethylenediamine, metaphenylenediamine, para-phenylenediamine, 4,4'-diaminodiphenylmethane, benzidine, 4',4'-diaminodiphenylamine, 4,4'-diaminodiphenylsulphide, 4,4'-diaminodiphenylsulphone, 4,4'-diaminodiphenyloxide, meta-xylylenediamine, para-xylylenediamine, 3,3',4,4'-tetraaminodiphenylmethane, 3,3',4,4'-tetraaminodiphenyloxide.

The above-mentioned chloroformates of polyols and polyamines determine the character of the hydrocarbon radicals located between the urethane groups in oligourethanacrylates and expressed by the radicals R', R" and R'" in the general formula.

The size of these radicals, and also the degree of polycondensation 'n' of oligourethanacrylates determine the molecular weight of the oligourethanacrylates and also their physico-chemical properties.

'n' can be zero, unity, and any integer greater than unity.

For bifunctional components (bis-chloroformates of glycols and bis-phenols or diamines), the magnitude of 'n' should preferably be from 0 to 5.

For the polyfunctional components, where the number of functional chloroformate or amino groups is 3 or 4, the value of 'n' should preferably be 0 or 1.

By varying the size of the radicals R', R", R'", and also the magnitude 'n', oligourethanacrylates of various molecular weights can be produced.

For example, if n is 0, and the telogen contains the functional amino group, oligourethanacrylates, with high molecular weights can be obtained by using bis-chloroformates of polyols in which R" is a high-molecular radical of a bifunctional oligoether or oligoester, for example, a radical of polyoxypropyleneglycol, polyoxyethyleneglycol or polyalkyl oligoester on the basis of dicarboxylic acids and glycols.

The increasing size of the radicals R,R',R" and R'" at constant value of 'n', or the increasing value of 'n' at invariable size of the radicals, and also their simultaneous increase, result in the increasing molecular weight of the oligourethanacrylates.

Depending on the nature and structure of the starting compounds, and also on the degree of polymerization (n), oligourethanacrylates are non-volatile colourless or faintly coloured liquids having no specific odour, of variable viscosity, or colourless relatively low-melting crystalline substances well soluble in various monomers and polymerizable oligomers of vinyl, acryl and allyl types, and also in most organic solvents. Interesting representatives of oligourethanacrylates, prepared by the proposed method are the following oligomeric compounds:

1. $CH_2=CH-COOCH_2CH_2NHCOO(CH_2)_4OOCNHCH_2CH_2OOC-CH=CH_2$
2. $CH_2=C(CH_3)-COOCH_2CH_2OOCNH(CH_2)_2NHCOOCH_2CH_2OOC-C(CH_3)=CH_2$
3. $CH_2=C(CH_3)-COOCH_2CH_2OOCNH(CH_2)_{10}NHCOOCH_2CH_2OOC-C(CH_3)=CH_2$
4. $CH_2=C(CH_3)COOCH_2CH_2NHCOO(CH_2)_2O(CH_2)_2OOCNHCH_2CH_2OOC-C(CH_3)=CH_2$
5. $CH_2=C(CH_3)COOCH_2CH_2N(C_6H_5)COO(CH_2)_2O(CH_2)_2OOCN(C_6H_5)CH_2CH_2OOC-C(CH_5)=CN_2$

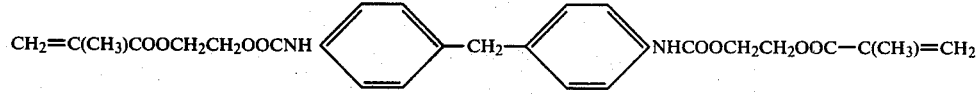

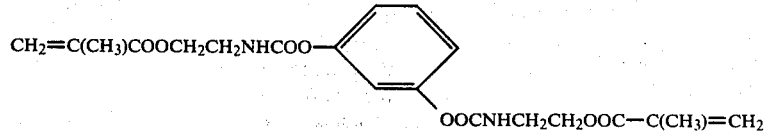

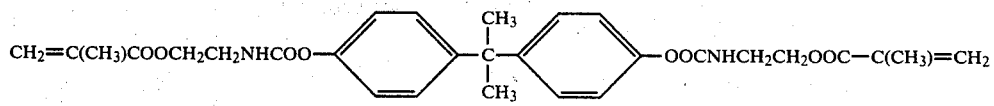

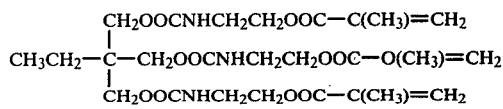

10.

11.

CH$_2$=C(CH$_3$)COOCH$_2$CH$_2$OOCNH(CH$_2$)$_2$NH-COO(CH$_2$)$_2$O(CH$_2$)$_2$OOCNH(CH$_2$)$_2$—NH-COOCH$_2$CH$_2$—OOC—C(CH$_3$)=CH$_2$

The present method can be used for the manufacture of the above-named now oligourethanacrylates (that is, when R' contains from 2 to 10 carbon atoms) as well as the known oligourethanacrylates (prepared by the isocyanate method), for example, those containing R' with six carbon atoms:

CH$_2$=C(CH$_3$)—COOCH$_2$CH$_2$OOCNH(CH$_2$)$_6$NH-COOCH$_2$CH$_2$OOC—C(CH$_5$)=CH$_2$

The proposed polymerizable oligourethanacrylates are prepared (as has already been said) by the methods which can be realized in two versions.

According to the first version, chloroformates of polyols are reacted with polyamines and telogens in a medium of organic solvents in the presence of organic bases, acceptors of hydrogen chloride which is evolved in the reaction, at temperatures within a range of from minus 10° C. to the boiling point of the particular solvent used in the reaction. The preferable range of process temperatures is from minus 10° C. to 80° C. The process is effected under atmospheric pressure in an anhydrous solvent with intense stirring of the reactants in the absence of inhibitors of the pre-polymerization process. The condensation reaction is continued, for 4–5 hours. The yield of oligourethanacrylates in the described version of the method is about 65–90 percent of theory.

According to the second version, chloroformates of polyols are reacted with polyamines and telogens in the conditions of the inter-phase condensation in a water-organic solvent system in the presence of organic bases or inorganic alkaline agents, viz., acceptors of hydrogen chloride, at room temperature.

The process is carried out under atmospheric pressure in the absence of inhibitors of polymerization and with intensive stirring of the reaction mixture which is formed by adding a solution of chloroformates of telogen or polyol in an anhydrous organic solvent to an aqueous solution of a diamine containing the acceptor of hydrogen chloride. The volume ratio of the aqueous phase to the organic phase should preferably be 1:1. The condensation reaction is continued for 15–30 minutes. The yield of oligourethanacrylates in this version of the method is from 90 to 95 percent of theory.

The reactants, viz., telogens, polyamines and chloroformates of polyols, are introduced into the reaction mixture either one after another or simultaneously.

In the stepwise addition of the components, oligourethanacrylates having molecular weights varying within a narrow range are obtained.

The ratio between the quantities of polyol chloroformiate and polyamine (with accounting for the number of the functional groups in these components) depends on a particular telogen and the value of "n".

Thus, at n=0, oligourethanacrylates are prepared as a result of condensation of a telogen with one of the said reactants. If the telogen contains the chloroformate functional group, it reacts with polyamine, and if the telogen contains the amine functional group, polyol chloroformate is added to the reaction mixture to react with the telogen.

The components are taken in stoichiometric quantities. For example if n=0, the molar ratio of the telogen to the bifunctional component diamine or bis-chloroformate of glycol or bis-phenol is 2:1, and to the tetrafunctional component tetramine or tetraol, 4:1.

The resultant products can be oligourethanacrylates of the following structure:

$$\left[ R'' + U-R-\overset{O}{\underset{\|}{C}}-O-C(X)=CH_2 \right]_p$$

where
R''' is R' or R'';
R, R' and R'' are the same as in the general formula;
p is the number of the functional groups in the component reacting with the telogen, which determines the required quantity of the telogen.

If n is 1, and one or both components (polyamine or polyol) are bifunctional compounds, their amount is determined by the molar ratio $$\frac{n}{n+1},$$

where n corresponds to the quantity of the component having the same functional group as in the telogen. If one or two components have more than two functional groups, the ratio of the components is determined from the stoichiometric reaction. For example, an oligourethanacrylate characterized by the formula:

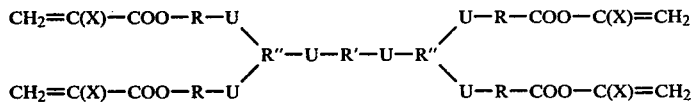

where:
n is 1;
R' is a diamine, radical;
R'' is a triol radical;
R is a telogen radical,
is prepared by the interaction between diamine and triol trichloroformate taken at a ratio of $$\frac{n}{n+1}$$

respectively, and a telogen having the functional amino group in an amount as required to form the compound of the above formula. If the components are introduced simultaneously, oligourethanacrylates, which are actually the closest telomer homologues, are obtained.

Acceptors of hydrogen chloride evolved in the reaction are tertiary amines, e.g. trimethylamine, triethylamine, tributylamine, pyridine, pyridine homologues and N,N-dimethylamine, are used in the first version of the method.

In the second version, the group of hydrogen chloride acceptors is larger. It includes organic bases, inorganic alkaline agents, such as pyridine, hydroxides or carbonates of alkali or alkaline-earth elements, for example potassium hydroxide, sodium hydroxide, sodium carbonate, potash, etc.

The organic solvents which are most suitable for the purpose are for example, methylene chloride, dichloroethane, trichloroethylene, nitrobenzene, nitromethane, dimethalformamide, benzene, toluene, etc.

The method for preparing oligourethanacrylates according to the first version is realized in a reaction vessel provided with a stirrer, a thermometer, a reflux condenser and a dropping funnel. An organic solvent, the amine component and the hydrogen chloride acceptor are loaded into the reaction vessel. The contents are cooled in a bath containing a cooling mixture to a temperature of minus 10° C. and then the chloroformate component in the same organic solvent is added gradually. The components are reacted with energetically stirring the reaction mixture, with the temperature being maintained within a range of from minus 10° C. to minus 5° C. When all the chloroformate component has been added, the temperature of the reaction mixture is raised to the boiling point of the solvent (or somewhat lower) and the reaction mixture is kept at this temperature for 3-4 hours. Upon termination of the reaction the mixture is cooled to room temperature, and treated with a 5 percent solution of hydrochloric acid. The organic layer is separated and washed with water to a neutral reaction and until the chloride ion is no longer present, dried over calcined sodium sulphate, filtered, and the solvent is then distilled under residual a pressure of 1-2 mm Hg.

According to another version, oligourethanacrylates are prepared in a reaction vessel into which an aqueous solution of the amine component and an acceptor of hydrogen chloride are placed. Then, the chloroformate component in an organic solvent is added into the reaction mixture with energetic stirring at room temperature. The aqueous layer is decanted, and the organic layer is washed with water to a neutral reaction. The solvent is then distilled at a residual pressure of 1-2 mm Hg. If the compounds are crystalline, the organic solvent is removed by distillation after decantation of the aqueous layer. The still residue is washed with water until no chloride ion is detected in the filtrate and is then dried in vacuum or in a dessicator over concentrated $H_2SO_4$.

The method for preparing oligourethanacrylates in the two versions can be realized with a simultaneous and separate introduction of the reactants. In the latter case provision is made for isolating the oligomeric compound from the reaction mixture for the purpose of subsequent condensation with a corresponding telogen. The condensation of the oligomeric compound with the telogen can be carried out immediately or with a lapse of time.

Unlike the first version of the method for preparing oligourethanacrylates, the second version is more advantageous from the technical point of view and with respect to the yields. The advantage of the second verson consist in (1) the feasibility of using polyamines in the form of salts, for example, their trichlorohydrates, which are less toxic, more stable and purer compounds; (2) the feasibility of using inorganic alkaline acceptors of hydrogen chloride; (3) carrying out the reactions at room temperature in a water-organic solvent system at high reaction rates between the reactants without using any extraneous sources of energy. The proposed method in either of the two versions considerably widens the range of raw materials that can be used in the manufacture of the relatively cheap readily polymerizable oligourethanacrylates and the variety of the oligourethanacrylates themselves.

The conditions in which the two versions can be realized exclude resinification and ensure the preparation of faintly coloured or colourless oligourethanacrylates with high yields. One of the advantages of the present invention is the preparation of new polymerizable oligomeric compounds containing urethane groups in their molecules obviating the use of isocyanates, which, in turn, rules out the formation of undesired unstable allophanic and biuret bonds and improves the service properties of the polyurethanes on their basis.

The specific feature of the herein proposed method is also the feasibility of the oligomerization of oligourethanacrylates, viz., the controlled preparation of ofoligourethanacrylates having various molecular weights, length and flexibility of the oligomeric molecule in acaccordance with the predetermined polycondensation coefficient n. Oligourethanacrylates are oligomerized in the reaction of non-equilibrium condensation by adjusting the ratios of the reacting polyfunctional components to the telogen with a simultaneous (the condensation telomerization principle) or separate introduction of the reactants into the reaction mixture. Oligourethanacrylates are capable of trimeric polymerization and copolymerization which proceed with the formation of non-melting and insoluble products. The solidification of oligourethanacrylates is accelerated by the action of heat, light, high-energy radiation (gamma rays, fast electrons), and by the initiators of radical-chain polymerization.

Oligourethanacrylates are capable not only of homopolymerization, but of copolymerization with each other, and also with a great number of bi- and polyfunctional monomers.

The most important feature of oligourethanacrylates is their ability of polymerization because of only terminal and regularly arranged unsaturated groups, which ensures the participation of the oligoester block of the type desired in the formation of trimeric structure of the solidified high-molecular polymer. This course of the process makes it possible to transfer the main properties of the oligoester into the corresponding reticulate polymer, which ensures the preparation on the basis of oligourethanacrylates of polymeric materials possessing the required structure and the desired set of technical properties.

By changing the chemical nature of the starting components and telogens, and also the size of the oligomeric block of oligourethanacrylates, it is possible to vary the properties of the prepared oligomers within a wide range, to change the structure of reticulate polymers on their basis, and thus to produce the desired effect on the physico-mechanical and electrical characteristics of the polymers, their resistance to heat, their water atmospheric elements, and other properties of the polymers.

A valuable complex of technical properties of oligourethanacrylates is responsible for their applicability to compositions of the contact binding glass-fibre materials, colourless film-forming materials, insulating compounds, glues, various sealing materials, etc.

For a better understanding of the invention it will further be illustrated by examples of the practical embodiment of the method for preparing the oligourethanacrylates, and their properties.

EXAMPLE 1

A mixture of 0.05 mol of ethylenediamine 0.11 mol of pyridine and 30 mol of methylene chloride and cooled to −10° C. in a four-necked flask provided with a stirrer, a thermometer, a reflux condenser and a dropping funnel, is combined with intense stirring (over two hours) a solution of 0.1 mol of monochloroformate of monometacrylic ester of ethylene glycol in 30 ml of methylene chloride so that the temperature of the reaction mixture would not rise above −10° C. When all the solution of monochloroformate of monomethacrylic ester of ethyleneglycol has been added, the temperature of the reaction mixture is raised to +43° C. and these conditions are maintained four hours with stirring. The contents of the flask are cooled to room temperature and treated with a 5 percent aqueous solution of hydrochloric acid. An organic layer is washed with water to a neutral reaction and in the absence of chloride ion, dried over calcined sodium sulphate, filtered, and then the solvent is distilled under a residual pressure of 1–2 mm Hg and a temperature of 25° C. The still residue is a colourless crystalline product having the following formula:

The yield of the product is 90 percent. M.p. 93°–95° C.
Found, percent: C, 51.37; H, 6.71; H, 7.54.
Calculated, percent: C, 51.6; H, 6.5; N, 7.52.

EXAMPLE 2

Under the conditions described in Example 1, and in a solution of dichloroethane 0.1 mol of monochloroformate of monometacrylic ester of ethyleneglycol reacts with 0.05 mol of hexamethylenediamine. The yield is 92 percent. The resultant product is a colourless crystalline substance having the formula:

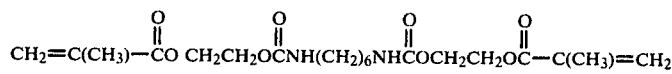

The melting point of the product is 73°–74° C.;
Calculated, percent: C, 56.06; H, 7.53; N, 6.54
Found, percent: C, 56.19; H, 7.57; N, 6.62.

EXAMPLE 3

Under the conditions of Example 1, and in a solution of methylene chloride, 0.4 mol of 4,4′-diaminodiphenylmethane reacts with 0.8 mol of chloroformate of monomethacrylic ester of ethyleneglycol. The reaction product is a crystalline substance having the following structure:

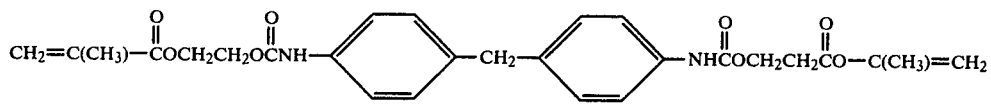

The yield of the product is 93 percent.
Calculated, percent: C, 63.52; H, 5.92; N, 5.49
Found, percent: C, 63.70; H, 6.14; N, 5.83.

EXAMPLE 4

A mixture of 0.1 mol of 2-aminoethylmethacrylate, 0.2 mol of pyridine and 25 ml of methylene chloride placed in a four-necked flask equipped with a stirrer, a thermometer, a reflux condenser and a dropping funnel, and cooled to −10° C., are combined with stirring (within two hours) to a solution of 0.05 mol of bis-chloroformate of diethyleneglycol in 25 ml of methylenechloride in such a way that the temperature of the reaction mixture does not rise above minus 10° C. As soon as all the solution of bis-chloroformate of diethyleneglycol has been added, the temperature of the reaction mixture is raised gradually to +43° C. and the mixture is maintained in these conditions for 4 hours with stirring.

The contents of the flask are then cooled to room temperature and treated with a 5 percent aqueous solution of hydrochloric acid. The organic layer is then washed with water to a neutral reaction and in the absence of chloride ion, dried over calcined sodium sulphate, filtered and the solvent is then distilled under a residual pressure of 1–2 mm Hg and a temperature of 25° C. The still residue is a colourless viscous product. Its physico-chemical characteristics are close to theory as calculated for the oligoester having the following structure:

The yield of the product is 90 percent.
Found, percent: C, 51.86; H, 6.68; N, 6.65;
Calculated, percent: C, 51.92; H, 6.78; N, 6.73.

EXAMPLE 5

Under the conditions described in Example 4, an oligourethanacrylate is prepared with bis-chloroformate of butyleneglycol-1,4 as the bis-chloroformiate and with N,N-dimethylaniline as the acceptor of hydrogen chloride. The product has the following formula:

$$CH_2=C(CH_3)-\overset{O}{\underset{\|}{C}}OCH_2CH_2NH\overset{O}{\underset{\|}{C}}O(CH_2)_4O\overset{O}{\underset{\|}{C}}NHCH_2CH_2O\overset{O}{\underset{\|}{C}}-C(CH_3)=CH_2$$

The yield of the product is 91 percent.
Found, percent: C, 53.78; H, 6.99; N, 7.14;
Calculated, percent: C, 53.99; H, 7.05; N, 7.00

EXAMPLE 6

Under the conditions described in Example 4, an oligourethanacrylate is prepared with bis-chloroformates of propyleneglycol-1,3 as the bis-chloroformate. The prepared product has the formula:

$$CH_2=C(CH_3)-\overset{O}{\underset{\|}{C}}OCH_2CH_2NH\overset{O}{\underset{\|}{C}}O(CH_2)_3O\overset{O}{\underset{\|}{C}}NHCH_2CH_2O\overset{O}{\underset{\|}{C}}-C(CH_3)=CH_2$$

Calculated, percent: N, 7.25; C, 52.84; H, 6.78;
Found, percent: C, 6.69; H, 6.69; N, 7.30.
The field of the product is 92 percent

EXAMPLE 7

Under the conditions described in Example 4, an oligourethanacrylate is prepared with bis-chloroformate of pentamethyleneglycol-1,5 being used as the bis-chloroformate. The product has the following formula:

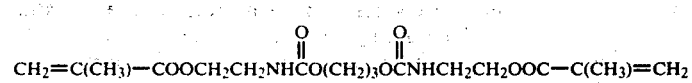
$$CH_2=C(CH_3)-COOCH_2CH_2NH\overset{O}{\underset{\|}{C}}O(CH_2)_3O\overset{O}{\underset{\|}{C}}NHCH_2CH_2OOC-C(CH_3)=CH_2$$

The yield of the product is 91 percent.
Found, percent: C, 54.98; H, 7.15; N, 6.80
Calculated, percent: C, 55.06; H, 7.30; N, 6.76;

EXAMPLE 8

Under the conditions described in Example 4, an oligourethanacrylate is formed with bis-chloroformates of hydroquinone as the bis-chloroformate, and triethylamine as the acceptor of hydrogen chloride. The resultant product has the following formula:

The yield of the product is 90 percent.
Found, percent: C, 57.05; H, 5.70; N, 6.70;
Calculated, percent: C, 57.14; H, 5.75; N, 6.66.

EXAMPLE 9

Under the conditions described in Example 4, an oligourethanacrylate is prepared with resorcinol bis-chloroformate. The resultant product has the following formula:

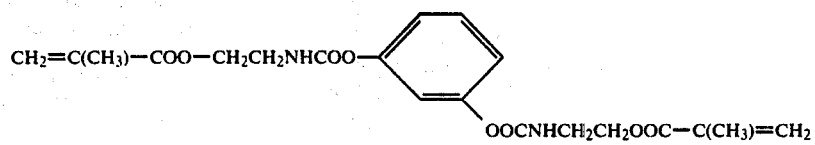

The yield of the product is 91 percent.

Found, percent: C, 57.01; H, 5.73; N, 6.71
Calculated, percent: C, 57.14; H, 5.73; N, 6.66.

EXAMPLE 10

Under the conditions described in Example 4, an oligourethanacrylate is prepared with diethyleneglycol bis-chloroformate as the bis-chloroformate, and phenylaminoethylmethacrylate as the telogen. The resultant product has the following formula:

$$CH_2=C(CH_3)-COOCH_2CH_2N(C_6N_5)COOCH_2CH_2OCH_2CH_2OOCN(C_6H_5)CH_2CH_2OOC-C(CH_3)=CH_2$$

$n_D^{20}=1.5312$; the yield of the product is 93 percent.
Calculated, percent: C, 63.37; H, 6.38; N, 4.93;
Found, percent: C, 63.40; H, 6.31; N, 5.00.

EXAMPLE 11

A mixture of 1 mol of ethylenediamine, 1.1 mol of pyridine and 150 ml of methylene chloride cooled to minus 10°–5° C. in a four-necked flask provided with a stirrer, a thermometer, a reflux condenser and a dropping funnel, are combined with 0.5 mol of bis-chloroformate of diethyleneglycol in 150 ml of methylene chloride being added gradually with energetic stirring, so that the reaction temperature would not rise above zero. As soon as the solution of bis-chloroformate has been added, the reaction mixture is heated gradually to 43° C. and kept at this temperature with stirring for two hours. Then, the mixture is cooled to 0° C., and one mol of chloroformate of monomethacrylic ester of ethyleneglycol is added as described in Example 1. The reaction mixture is processed and the product is isolated as described in Example 1. The resultant product has the following formula:

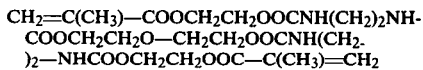
$CH_2=C(CH_3)-COOCH_2CH_2OOCNH(CH_2)_2NH-COOCH_2CH_2O-CH_2CH_2OOCNH(CH_2-)_2-NHCOOCH_2CH_2OOC-C(CH_3)=CH_2$ The yield of the product is 89 percent.
Found, percent: N, 9.62; C, 48.90; H, 6.40;
Calculated, percent: C, 48.81; H, 6.49; N, 9.49

EXAMPLE 12

Under the conditions described in Example 4, an, oligourethanacrylate is prepared with a bis-chloroformate of butyleneglycol-1,4 as the bis-chloroformate, and 2-aminoethylacrylate as the telogen. The resultant product has the following formula:

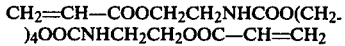
$CH_2=CH-COOCH_2CH_2NHCOO(CH_2-)_4OOCNHCH_2CH_2OOC-CH=CH_2$

The yield of the product is 90 percent.
Found, percent: C, 51.65; H, 6.56; N, 7.55;
Calculated, percent: C, 51.61; H, 6.50; N, 7.52

EXAMPLE 13

Under the conditions described in Example 4, an oligourethanacrylate is prepared with a bis-chloroformate of diphenylolpropane as the bis-chloroformate, and 2-aminoethylmethylacrylate as the telogen. The product has the following formula:

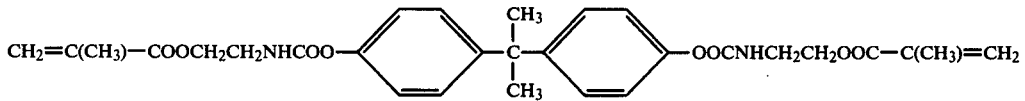

The yield of the product is 92 percent.
Found, percent: C, 64.70; H, 6.45; N, 5.26;
Calculated, percent: C, 64.67; H, 6.36; N, 5.20.

EXAMPLE 14

Under the conditions described in Example 4, an oligourethanacrylate is prepared with a bis-chloroformate of polyoxypropyleneglycol as the bis-chloroformate having a molecular weight of 200, and 2-aminoethylmethacrylate as the telogen. The resultant product has the following formula:

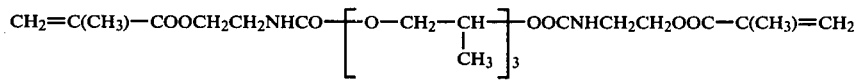

The yield of the product is 85 percent.
Found, percent: C, 55.18; H, 7.65; N, 5.69;
Calculated, percent: C, 54.97; H, 7.62; N, 5.57.

EXAMPLE 15

A flask provided with a high-speed stirrer, a thermometer, and a dropping funnel, are inocculated with 0.2 mol of ethylenediamine in the form of a 70 percent aqueous solution and 0.44 mol of sodium hydroxide in 250 ml of water. The mixture is cooled with intense stirring to a temperature of not above +15° C. and then 0.4 mol of chloroformate of monomethacrylic ester of ethyleneglycol in 250 ml of anhydrous freshly distilled methylene chloride are added. The reaction mixture is stirred for 15 minutes, then allowed to stand for delamination and the aqueous layer is decanted. The organic layer is washed with water to a neutral reaction. The still residue (after distillation of the solvent) is washed with water until no chloride ion is detected in the filtrate, and dried in vacuum or a dessicator over concentrated sulphuric acid. The resultant product is a colourless crystalline substance having the following formula:

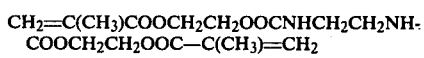
$CH_2=C(CH_3)COOCH_2CH_2OOCNHCH_2CH_2NH-COOCH_2CH_2OOC-C(CH_3)=CH_2$

The yield of the product is 94 percent.
Found, percent: C, 51.48; H, 6.51; N, 7.56;
Calculated, percent: C, 51.61; H, 6.50; N, 7.52.

EXAMPLE 16

Under the conditions described in Example 15, and in a solution of methylene chloride, 0.2 mol of ethylenediamine hydrochloride reacts with 0.4 mol of a chloroformate of monomethacrylic ester of ethyleneglycol. The resultant product is a colourless crystalline substance having the following formula:

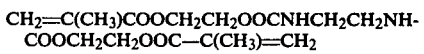
$CH_2=C(CH_3)COOCH_2CH_2OOCNHCH_2CH_2NH-COOCH_2CH_2OOC-C(CH_3)=CH_2$

The yield of the product is 95 percent. The assay is the same as in Example 15.

EXAMPLE 17

Under the conditions described in Example 15, and a mixture of 0.2 mol of hexamethylenediamine hydrochloride and 0.88 mol of sodium chloride in 200 ml of water are added with intense stirring to 0.4 ml mol of chloroformate of monomethacrylic ester of ethyleneglycol in 250 ml of anhydrous methylene chloride. The contents are stirred for 15 minutes. The temperature is maintained during the reaction at a level of not above +15° C. The product has the following formula:

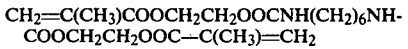
$CH_2=C(CH_3)COOCH_2CH_2OOCNH(CH_2)_6NH-COOCH_2CH_2OOC-C(CH_3)=CH_2$

The yield of the product is 96 percent. The assay is the same as in Example 2.

EXAMPLE 18

Under the conditions described in Example 15, 250 ml of water, and 100 ml of dichloroethane, 0.44 mol of sodium hydroxide and 0.2 mol of diaminodiphenylmethane are mixed together. The components are mixed while cooling with 0.4 mol of monochloroformate of monomethacrylic ester of ethyleneglycol in 150 ml of dichloroethane. The mixing time is 30 minutes. The reaction mixture is treated and the product is isolated.

The resultant product has the following formula:

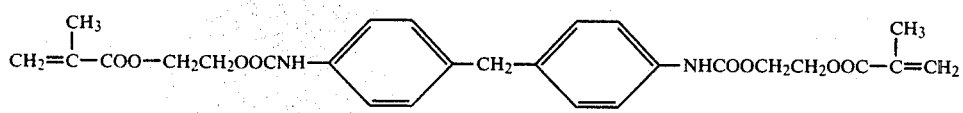

The yield of the product is 99 percent. The assay is the same as in Example 3.

EXAMPLE 19

Under the conditions described in Example 15, and using sodium hydrogen carbonate as the acceptor of hydrogen chloride, in a solution of methylene chloride 0.1 mol of chloroformate of monomethacrylic ester of ethyleneglycol is reacted with 0.05 mol of n-phenylenediamine. The resultant product has the following formula:

The yield of the product is 95 percent.
Found, percent: C, 57.25; H, 5.80; N, 6.70;
Calculated, percent: C, 57.14; H, 5.75; N, 6.66.

EXAMPLE 20

Under the conditions described in Example 15, a mixture of 100 ml of water, 50 ml of methylene chloride, 0.88 mol of sodium chloride and 0.08 mol of phenylaminoethylmethacrylic are cooled to a temperature of not above +15° C., and 0.04 mol of bis-chloroformate of diethyleneglycol in 50 ml of methylene chloride is added with intense stirring. The mixing time is 30 minutes. After delamination of the reaction mixture, the organic layer is washed with water to a neutral reaction and in the absence of chloride ion is dried over calcined sodium sulphate, filtered, and the solvent is distilled in vacuum. The still residue is a faintly coloured viscous product having the following formula:

CH$_2$=C(CH$_3$)—COOCH$_2$CH$_2$N(C$_6$H$_5$-
)COOCH$_2$CH$_2$OCH$_2$CH$_2$OOCN(C$_6$H$_5$)CH$_2$C-
N$_2$OOC—C(CH$_3$)=CH$_2$

The yield of the product is 92 percent.
Calculated, percent: C, 63.37; H, 6.38; N, 4.93.
Found, percent: C, 63.40; H, 6.41; N, 5.10.

EXAMPLE 21

Under the conditions described in Example 15, and in a solution of dichloroethane, 0.1 mol of chloroformate of monomethacrylic ester of ethyleneglycol reacts with 0.05 mol of decamethylenediamine. The resultant product has the following formula:

CH$_2$=C(CH$_3$)COOCH$_2$CH$_2$OOCNH(CH$_2$)$_{10}$NH-
COOCH$_2$CH$_2$OOC—C(CH$_3$)=CH$_2$

Found, percent: C, 59.53; H, 8.30; N, 5.83;
Calculated, percent: C, 59.49; H, 8.32; N, 5.78.

EXAMPLE 22

Under the conditions described in Example 15, in a solution of methylene chloride, 0.1 mol of trichloroformate of etriol reacts with 0.3 mol of 2-aminoethylmethacrylae. The resultant product has the following formula:

CH$_2$OOCNHCH$_2$CH$_2$OOC—C(CH$_3$)=CH$_2$
|
CH$_3$—CH$_2$—C—CH$_2$OOCNHCH$_2$CH$_2$OOC—C(CH$_3$)=CH$_2$
|
CH$_2$OOCNHCH$_2$CH$_2$OOC—C(CH$_3$)=CH$_2$

The yield of the product is 88 percent.
Found, percent: C, 54.25; H, 6.98; N, 7.10.
Calculated, percent: C, 54.08; H, 6.89; N, 7.01.

EXAMPLE 23

Under the conditions described in Example 18, 0.1 mol of 3,3',4,4'-tetraaminodiphenylmethane reacts with 0.4 mol of chloroformate of monomethacrylic ester of ethylene glycol. The resultant product has the following formula:

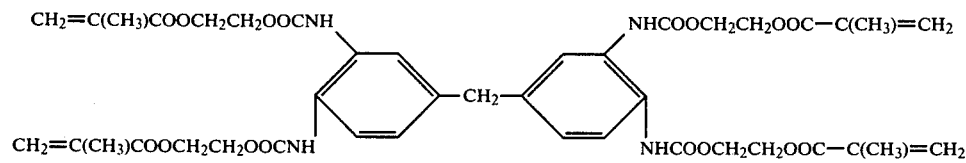

The yield of the product is 82 percent.
Found, percent: C, 57.39; H, 6.38; N, 6.70.
Calculated, percent: C, 57.33; H, 6.34; N, 6.52.

EXAMPLE 24

Under the conditions described in Example 18, and in a solution of chloroform, 0.2 mol of 3,3',4,4'-tetraaminodiphenyloxide reacts with 0.8 mol of chloroformate of monomethacrylic ester of ethylene glycol. The resultant product has the following formula:

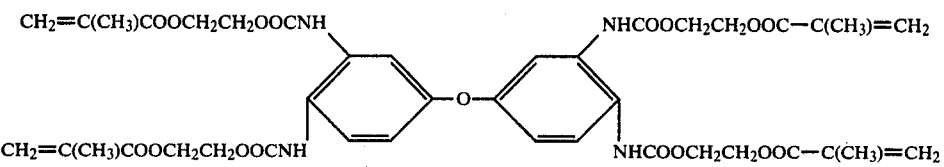

The yield of the product is 84 percent.
Found, percent: C, 56.98; H, 6.15; N, 6.70.
Calculated, percent: C, 56.87; H, 6.20; N, 6.63;.

EXAMPLE 25

Under the conditions described in Example 18, 0.15 mol of 4,4'-diaminodiphenyloxide reacts with 0.3 mol of chloroformate of monomethacrylic ester of ethyleneglycol. The resultant product has the formula:

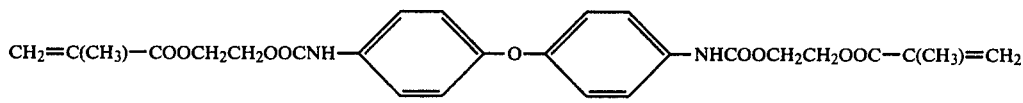

The yield of the product is 83 percent.
Found, percent C, 61.19; H, 5.65; N, 5.51;
Calculated, percent: C, 60.93; H, 5.51; N, 5.46.

EXAMPLE 26

Under the conditions described in Example 18, 0.2 mol of 4,4'-diaminodiphenylsulphone is reacted with 0.4 mol of chloroformate of monomethaclyic ester of ethyleneglycol. The resultant product has the following formula:

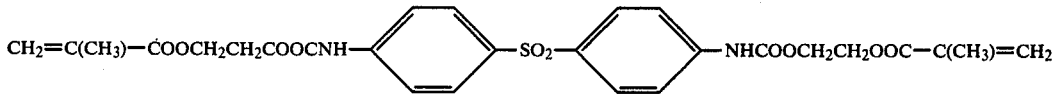

The yield of the product is 85 percent.
Found, percent: C, 59.20; H, 5.46; N, 5.35.
Calculated, percent: C, 59.09; H, 5.34; N, 5.30.

EXAMPLE 27

A polymer on the basis of the oligourethanacrylate having the formula:

$CH_2=C(CH_3)COOCH_2CH_2N(C_6H_5)COO(CH_2)_2O(CH_2)_2COON(C_6N_5)-CH_2C-H_2OOC-C(CH_3)=CH_2$ is prepared by solidification of the above compound according to the radical mechanism for three hours at a temperature of 90° C. in the presence of 0.5 percent of azo-bis-isobutyronitrille. The polymer is a transparent, faintly coloured, non-melting and insoluble product.

EXAMPLE 28

A polymer on the basis of oligourethanacrylate having the formula:

$CH_2=C(CH_3)-COOCH_2CH_2NHCOO(CH_2)_2O(CH_2)_2OOCNHCH_2C-H_2OOC-C(CH_3)=CH_2$ is prepared by solidification of the above compound for three hours at a temperature of 90° C. in the presence of 0.5 percent of azo-bis-isobutyronitrile. The polymer is a transparent, colourless, non-melting product and is insoluble in organic solvents.

EXAMPLE 29

A polymer on the basis of an oligourethanacrylate having the formula:

$CH_2=C(CH_3)COOCH_2CH_2NHCOOCH_2C-H_2OOCNHCH_2CH_2OOC-C(CH_3)=CH_2$ is prepared by thermal polymerization for three hours at a temperature of 120° C. (solidification point). The polymer is a non-melting, insoluble transparent product.

EXAMPLE 30

A polymer on the basis of oligourethanacrylate having the formula:

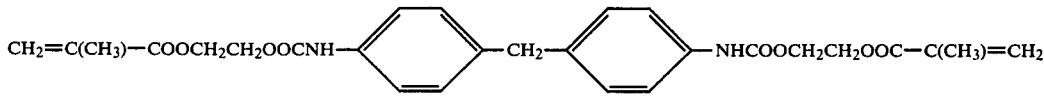

prepared during solidification of the above compound for three hours at a temperature of 120° C.

The solidified oligourethanacrylate is a faintly coloured, transparent, non-melting, insoluble product.

We claim:

1. An Oligourethanacrylate characterized by the formula:

$CH_2=CH-COOCH_2CH_2NHCOO(CH_2)_4OOCNHCH_2CH_2OOC-CH=CH_2$.

2. An Oligourethanacrylate characterized by th formula:

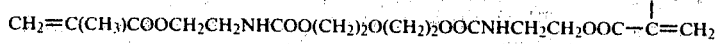

3. An Oligourethanacrylate characterized by the formula:

CH$_2$=C(CH$_3$)COOCH$_2$CH$_2$H(C$_6$H$_5$)COO(CH$_2$)$_2$O(CH$_2$)$_2$OOCH(C$_6$H$_5$)CH$_2$C-H$_2$OOC—C(CH$_3$)=CH$_2$.

4. An Oligourethanacrylate characterized by the formula:

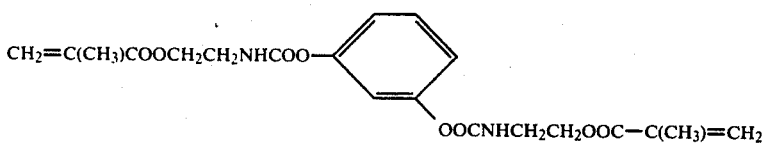

5. An Oligourethanacrylate characterized by the formula:

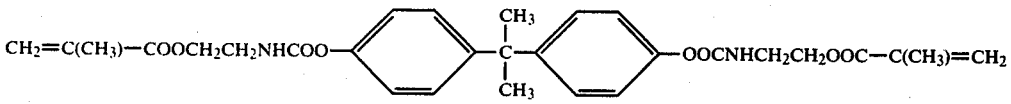

6. An Oligourethanacrylate characterized by the formula:

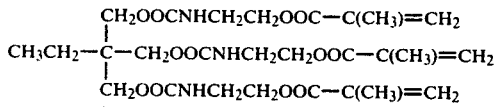

7. An Oligourethanacrylate characterized by the formula:

CH$_2$=C(CH$_3$)—COOCH$_2$CH$_2$OOCNH(CH$_2$)$_2$NH-COO(CH$_2$)$_2$O(CH$_2$)$_2$OOCNH(CH$_2$)$_2$—NH-COOCH$_2$CH$_2$-OOC—C(CH$_3$)=CH$_2$.

8. A method for preparing oligourethanacrylates comprising carry out the reaction of non-equilibrium polycondensation of chloroformates of polyols with polyamines and telogens selected from the group consisting of chloroformates of monesters of alkyleneglycols and acids of the acrylic series, chloroformates of monoesters of bis-phenols and acids of the acrylic series, monoaminoalkyl esters of acids of the acrylic series, N-substituted monoaminoalkyl esters of acids of the acrylic series, in a medium of organic solvents in the presence of acceptors of hydrogen chloride evolved in the course of the reaction, at temperatures within the range from minus 10° C. to the boiling point of the particular solvent used in the process.

9. A method according to claim 8, in which the reaction of the non-equilibrium polycondensation of the components is carried out in a system comprising water and an organic solvent at room temperature.

10. A method according to claim 8, in which compounds selected from the group consisting of chloroformates of propyleneglycol-1,3, butyleneglycol-1,4, pentamethyleneglycol-1,5, diethyleneglycol, hydroquinone, resorcinol, etriol, diphenylolpropane, and polyoxypropyleneglycol having a molecular weight of about 200, are used in the process the chloroformates of polyols.

11. A method according to claim 8, in which compounds selected from the group consisting of ethylenediamine, hexamethylenediamine, decamethylenediamine, n-phenylenediamine, 4,4'-diaminodiphenylmethane, 4,4'-diaminodiphenyloxide, 4,4'-diaminodiphenylsulphone, 3,3',4,4'-tetraaminodiphenylmethane and 3,3',4,4'-tetraaminodiphenyloxide are used as polyamines.

12. A method according to claim 8, in which compounds selected from the group consisting of chloroformate of monometacrylic ether of ethyleneglycol, 2-aminoethylmetacrylate, 2-aminoethylacrylate, 2-phenylaminoethylmetacrylate are used as the telogens.

13. A method according to claim 8, in which oligourethanacrylates with n being equal to or greater than unity are prepared by condensation of the telogen containing a chloroformate group, and an oligomeric compound, said oligomeric compound being prepared by condensation of polyamines with bis-chloroformates selected from the group consisting of bis-chloroformates of glycols and bis-chloroformates of bis-phenols, at a ratio of polyamine to bis-chloroformates equal to $$\frac{n+1}{n}.$$

14. A method according to claim 8, in which oligourethanacrylates with n being equal to or greater than unity are prepared by the condensation of the telogen containing an amino group and an oligomeric compound having terminal chloroformate groups prepared by condensation of diamines with chloroformates of polyols, the ratio of diamine to chloroformate polyol being equal to $$\frac{n}{n+1}.$$

15. A method according to claim 8, in which the reactants are taken in stoichiometric ratio.

16. A method according to claim 8, wherein the solvents are compounds selected from the group consisting of lower chloroalkanes, nitroalkanes, benzene, homologues of benzene, and tetrahydrofurance.

17. A method according to claim 8, in which a tertiary amine selected from the group consisting of trimethylamine, triethylamine, tributylamine, pyridine, homogues of pyridine, N,N-dimethylamiline, N,N-diethylaniline, inorganic alkaline agents selected from the group consisting of oxides, hydroxides and carbonates of alkali and alkaline earth metals are used as acceptors of hydrogen chloride.

18. A method according to claim 9, wherein said polyamines are of polyamines with acids selected from the group consisting of HCL, HBr and $H_2SO_4$.

19. A method according to claim 9, wherein said polyamines are aqueous solutions of polyamines.

20. A method according to claim 8, in which the reaction is carried out at temperatures within a range of from minus 10° C. to plus 80° C.

* * * * *

UNITED STATES PATENT AND TRADEMARK OFFICE
CERTIFICATE OF CORRECTION

PATENT NO. : 4,250,322

DATED : February 10, 1981

INVENTOR(S) : Alexei V. Efimov, et al.

It is certified that error appears in the above—identified patent and that said Letters Patent is hereby corrected as shown below:

On The Title Page, Item (76), should read

-- Inventors: Alfred A. Berlin, Leninsky prospekt 57, kv 9, Moscow; Tamara Y. Kefeli, Krasnoprudnaya ulitsa, 22/24, kv. 103, Moscow; Nina V. Varlamova, Dmitrovskoe shosse 40/7, kv. 20, Moscow; Grigory M. Strongin, prospekt Lenina 83, kv. 2a, Dzerzhinsk, Gorkovskoi oblasti; Judif M. Altshuler, Uchebny pereulok, 8, kv. 67, Dzerzhinsk, Gorkovskow oblasti; Boris I. Kolomazov, prospekt Pobedy 1/2, kv. 8, Dzerzhinsk, Gorkovskoi oblasti; Alexei V. Efimov, prospekt Lenina 85, kv. 43, Dzerzhinsk, Gorkovskoi oblasti, all of U.S.S.R. --.

[57] ABSTRACT, Line 12, should read: --R''' is R' if the telogen contains--

Column 3, line 66, delete "M" and insert therefor --n--

Column 8, line 28, ' R" ' should read -- R''' --.

UNITED STATES PATENT AND TRADEMARK OFFICE
CERTIFICATE OF CORRECTION

PATENT NO. : 4,250,322            Page 2 of 2

DATED : February 10, 1981

INVENTOR(S) : ALEXEI V. EFIMOV, et al.

It is certified that error appears in the above—identified patent and that said Letters Patent is hereby corrected as shown below:

Column 13, line 48, should read

-- $CH_2=C(CH_3)-COOCH_2CH_2NH\overset{O}{\overset{\|}{C}}O(CH_2)_5O\overset{O}{\overset{\|}{C}}NHCH_2CH_2OOC-C(CH_3)=CH_2$ --.

Column 17, line 60, should read -- $H_2OOC-C(CH_3)=CH_2$ --.

Column 21, line 9, should read --

$CH_2=C(CH_3) \; COOCH_2CH_2N(C_6H_5)COO(CH_2)_2 \; O(CH_2)_2OOCN(C_6H_5)CH_2CH_2$ $OOC-C(CH_3)=CH_2$. --.

Signed and Sealed this

Eighth Day of June 1982

[SEAL]

Attest:

GERALD J. MOSSINGHOFF

Attesting Officer     Commissioner of Patents and Trademarks